(12) United States Patent
Kellum

(10) Patent No.: US 7,561,846 B2
(45) Date of Patent: Jul. 14, 2009

(54) VEHICLE-TO-VEHICLE COMMUNICATION

(75) Inventor: Carroll C. Kellum, Rochester Hills, MI (US)

(73) Assignee: GM Gobal Technology Operations, Inc., Detroit, MI (US)

( * ) Notice: Subject to any disclaimer, the term of this patent is extended or adjusted under 35 U.S.C. 154(b) by 582 days.

(21) Appl. No.: 11/220,466

(22) Filed: Sep. 7, 2005

(65) Prior Publication Data

US 2007/0054685 A1    Mar. 8, 2007

(51) Int. Cl.
*H04B 5/00*    (2006.01)
(52) U.S. Cl. .................. 455/41.2; 455/345; 455/412.2; 455/517
(58) Field of Classification Search .................. 455/517, 455/456.1, 41.1, 41.2, 456.3, 445, 456.6, 455/345, 569.2, 466, 435.1, 412.2, 454, 3.05, 455/452.1
See application file for complete search history.

(56) References Cited

U.S. PATENT DOCUMENTS

| 5,875,183 | A | * | 2/1999 | Nitadori | 370/328 |
| 6,608,567 | B2 | * | 8/2003 | Matsumoto | 340/905 |
| 7,286,825 | B2 | * | 10/2007 | Shishido et al. | 455/435.1 |
| 2004/0010366 | A1 | | 1/2004 | Videtich | 701/201 |
| 2004/0203436 | A1 | | 10/2004 | Oesterling | 455/67.11 |
| 2004/0203919 | A1 | * | 10/2004 | Ross et al. | 455/456.1 |
| 2005/0088318 | A1 | * | 4/2005 | Liu et al. | 340/902 |

* cited by examiner

*Primary Examiner*—John J Lee

(57) ABSTRACT

A method for vehicle-to-vehicle communication. The method includes receiving data about a first vehicle and a second vehicle within a proximity of an intermediate node, where the receiving is at the intermediate node. The first vehicle is notified about the presence of the second vehicle and/or the second vehicle is notified about the presence of the first vehicle in response to the receiving.

13 Claims, 3 Drawing Sheets ized as an intermediate node. The first vehicle is notified about the presence of the second vehicle and/or the second vehicle is notified about the presence of the first vehicle in response to the receiving.

VEHICLE-TO-VEHICLE COMMUNICATION

BACKGROUND OF THE INVENTION

The present disclosure relates generally to vehicle-to-vehicle communication, and more particularly, to utilizing an intermediate node to facilitate the vehicle-to-vehicle communication.

Many active safety (AS) and driver assistance (DA) systems require information from neighboring vehicles to perform their functions. Using these applications (AS and DA) in the context of vehicle-to-vehicle communication, vehicles must discover one another and establish a communication link to exchange information. Although the standards are still evolving, the current framework for achieving periodic communication between vehicles involves each vehicle broadcasting its spatial information to other vehicles with no acknowledgement of reception. The only method for discovering the existence of a neighboring vehicle is to successfully receive a broadcast message from that vehicle. This method is likely to work well under normal circumstances when vehicles occupy the same roadway and there are no obstructions between the vehicles.

FIG. 1 depicts a scenario where the broadcast communication method fails. The broadcast range of vehicle A 102 is shown by the arc 112 in FIG. 1. Because vehicle C 102 is outside of the arc 112, it is unable to receive broadcast messages from vehicle A 102. If vehicle C 106 was within the arc 112, it is likely that the building 110 blocking the line-of-sight between the vehicles would also block the direct communication between the vehicles. Similarly, vehicle D 108 is also outside of the arc 112 that represents the broadcast range of vehicle A 102. Vehicle A 102 might not need to be notified about the presence of Vehicle D 108 because vehicle A 102 and vehicle D 108 do not have coincident paths.

It would be desirable for Vehicle A 102 to know about the presence of Vehicle C 106 and vice versa, particularly if the two vehicles have coincident paths.

BRIEF DESCRIPTION OF THE INVENTION

According to one aspect of the invention, a method is provided for vehicle-to-vehicle communication. The method includes receiving data about a first vehicle and a second vehicle within a proximity of an intermediate node, where the receiving is at the intermediate node. The first vehicle is notified about the presence of the second vehicle and/or the second vehicle is notified about the presence of the first vehicle in response to the receiving.

In another aspect of the invention, a system is provided for vehicle-to-vehicle communication. The system includes a telematics unit and a processor in communication with the telematics unit. The processor includes instructions for facilitating receiving data about a first vehicle and a second vehicle that are within a proximity of an intermediate node. The receiving is at the intermediate node via the telematics unit. The first vehicle is notified about the presence of the second vehicle and/or the second vehicle is notified about the presence of the first vehicle in response to the receiving. The notifying is via the telematics unit.

In a further aspect of the invention, a computer program product is provided for vehicle-to-vehicle communication. The computer program product includes a storage medium readable by a processing circuit and storing instructions for execution by the processing circuit for performing a method. The method includes receiving data about a first vehicle and a second vehicle within a proximity of an intermediate node, where the receiving is at the intermediate node. The first vehicle is notified about the presence of the second vehicle and/or the second vehicle is notified about the presence of the first vehicle in response to the receiving.

BRIEF DESCRIPTION OF THE DRAWINGS

Referring now to the figures, which are meant to be exemplary embodiments, and wherein the like elements are numbered alike.

DETAILED DESCRIPTION OF THE INVENTION

Figure 1:
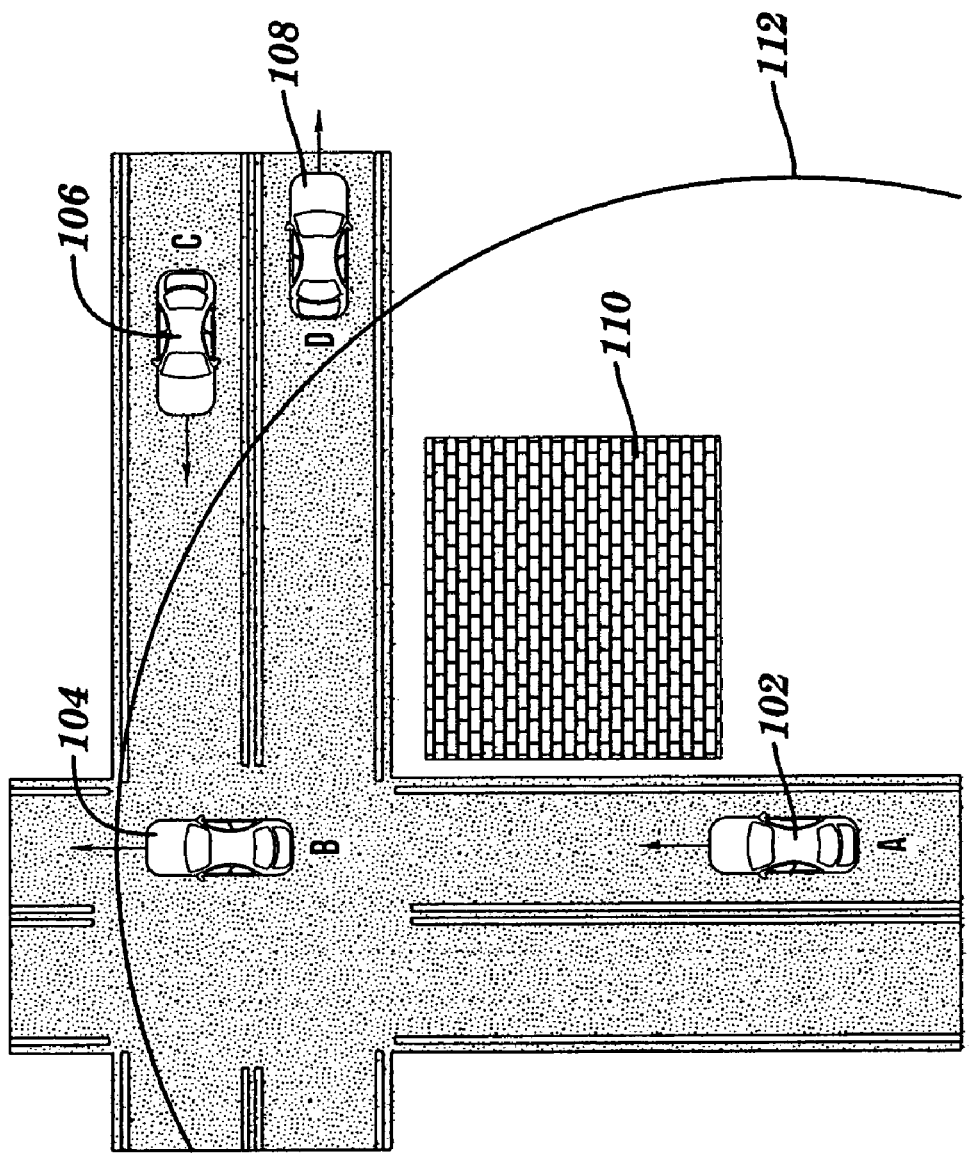
FIG. 1 is a block diagram of scenario where exemplary embodiments of the present invention may be utilized to provide communication between two vehicles.

FIG. 1 is a block diagram of a scenario where exemplary embodiments of the present invention may be utilized to provide communication between two vehicles. An intermediate communication node aids two other nodes in their discovery of and communication between each other in a mobile communications environment. Exemplary embodiments of the present invention provide a method of utilizing vehicle B 104 (also referred to herein as an intermediate node), to allow vehicle A 102 (also referred to herein as the first vehicle) to discover vehicle C 106 (also referred to herein as the second vehicle) and vice versa. Once the discovery is made, the two vehicles (vehicle A 102 and vehicle C 106) may communicate with one another through vehicle B 104 (the intermediate node) by using a different network protocol or by using a different set of communication parameters, such as a higher power level or different communication channel.

FIG. 1 depicts a simple scenario where vehicle B 104 is able to receive broadcast messages from both vehicle A 102 and vehicle C 106. Vehicle A 102 and vehicle C 106 are not able to receive each other's broadcast messages since the communication range of the broadcast is exceeded and/or an object (the building 110) obstructs the line-of-sight between the two. In this scenario, vehicle B 104 has received messages from both vehicle A 102 and vehicle C 106 and is aware of the other vehicles' locations and dynamics. Before enabling itself as an intermediate node between vehicle A 102 and vehicle C 106, vehicle B 104 may determine if it is useful for the two vehicles to communicate and whether the two vehicles are already communicating. Vehicle B 104 (the intermediate node) may perform these two tasks in an order or perform them in parallel.

Figure 2:
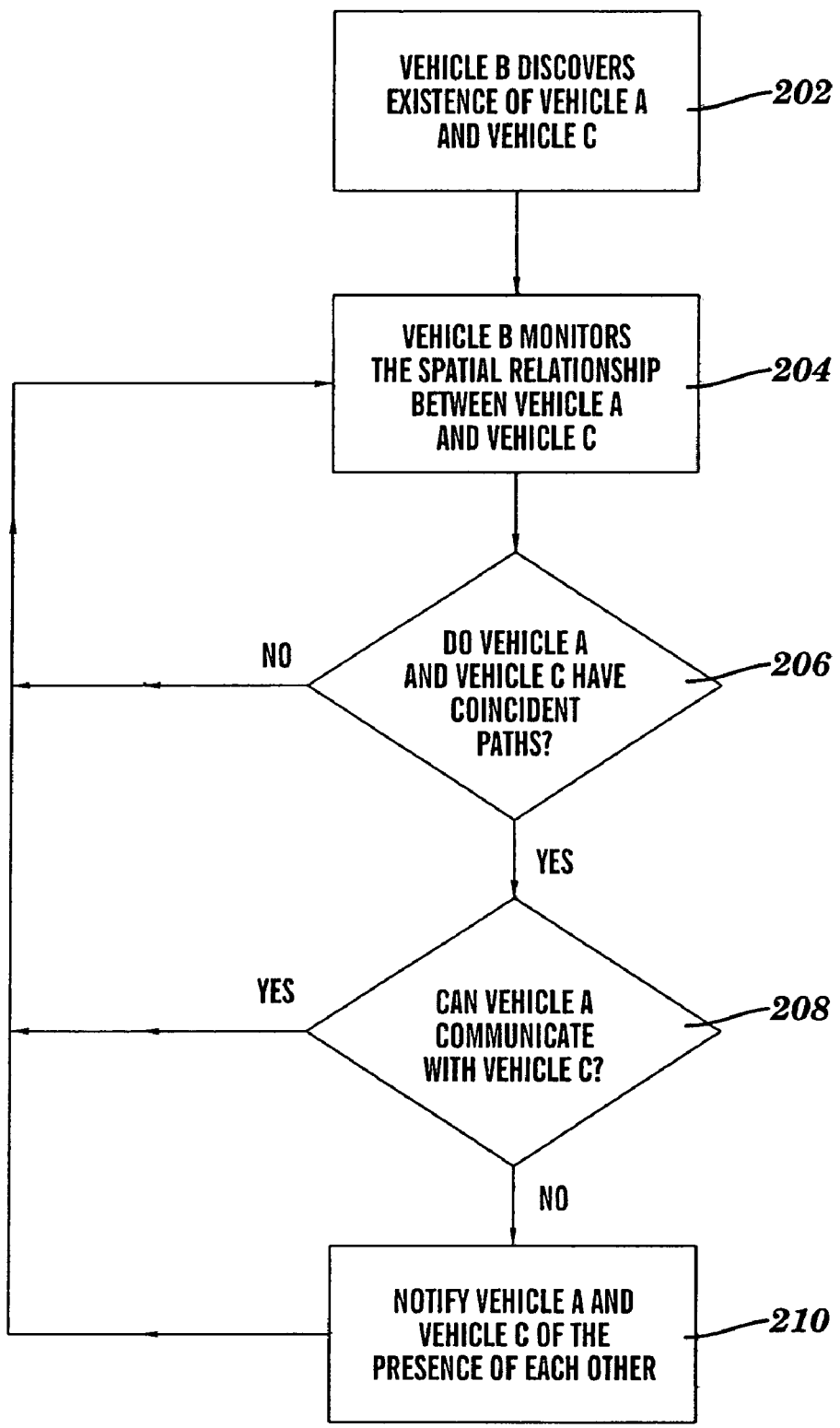
FIG. 2 is a process flow that may be implemented by exemplary embodiments of the present invention.

FIG. 2 is a process flow that may be implemented by exemplary embodiments of the present invention to provide vehicle-to-vehicle communication between vehicle A 102 and vehicle C 106. At block 202, vehicle B 104 discovers vehicle A 102 and vehicle C 106. Vehicle A 102 and vehicle C 106 are within a proximity of vehicle B 104 which is limited by the range of the telematics units used to broadcast data from vehicle A 102 and vehicle C 106. In addition, the user may further limit the proximity of vehicle A 102 and vehicle C 106 to vehicle B 104 before initiating the processing depicted in FIG. 2.

In exemplary embodiments of the present invention, vehicle B 104 is monitoring a communication channel that is reserved for vehicle-to-vehicle communication. Both vehicle A 102 and vehicle C 106 are constantly broadcasting their presence via this communication channel. The broadcasting may include just the geographic location (e.g., global positioning service (GPS) coordinates) with more specific information about vehicle A 102 or vehicle C 106 being transferred to vehicle B 104 in response to an inquiry to vehicle A 102 or vehicle C 106 from vehicle B 104. The more specific information (also referred to herein as dynamic information) may include speed of the vehicle and heading of the vehicle. The dynamic information may be transferred to vehicle B 104 via a different channel than that used for the geographical location and/or via a different network protocol than that used for the geographical location. Alternatively, both the geographical location and the dynamic information may be broadcast via the same communication channel on a continuous basis and not only in response to a request for the data from the intermediate node (in this example, vehicle B 104).

By observing the broadcast messages emitted by vehicle A 102 and vehicle C 106, vehicle B 104 can collect the location and dynamic information from vehicle A 102 and vehicle C 106. Dynamic information refers to information used to predict the future location of the vehicle to which the information pertains. Dynamic information may include, but is not limited to, any vehicle data such as speed of the vehicle, heading of the vehicle, yaw-rate of the vehicle, steering angle of the vehicle, acceleration of the vehicle, brake status of the vehicle, turn signal status of the vehicle, type of AS system on the vehicle, AS generated data, type of DA system on the vehicle, DA generated data. At block 204, vehicle B 104 monitors the spatial relationship between vehicle A 102 and vehicle C 106 using the collected location and dynamic information. In block 206, the intermediate node (vehicle B 104) determines if vehicle A 102 and vehicle C 106 have coincident paths. Coincident paths occur when vehicle A 102 and Vehicle C 106 are in the same geographic area at the same time. Vehicle A 102 and vehicle C 106 may have coincident paths, for example, if the vehicles are within some specified range of each other or if they are estimated to come within a specified range of each other. The specified range may be user defined, variable with dynamic conditions, or a default value may be utilized. In some cases, the existence of a coincident path may indicate the possibility of a collision between the two vehicles. The example rules below may be applied to the location and dynamic information received from vehicle A 102 and vehicle C 106 to determine whether or not the two vehicles should be communicating to each other because they have coincident paths (actual and/ or some estimated likelihood). As input to the rules, vehicle B 104 may estimate the future paths of the vehicle A 102 and vehicle C 106 using standard calculations based on current position, vehicle heading, yaw-rate, steering angle, and acceleration. Some sample rules are as follows:

1. vehicle A 102 and vehicle C 106 are within some range of one another;
2. vehicle A 102 and vehicle C 106 are within some time of one another (where the time may be user defined or a default value may be utilized and time refers to time to collision based on the current locations of the vehicles)
3. the estimated paths of vehicle A 102 and vehicle C 106 intersect;
4. vehicle A 102 and vehicle C 106 are estimated to come within some range of one another;
5. vehicle A 102 and vehicle C 106 are estimated to come within some time of one another (where the time refers to time to collision based on a prediction of future locations of vehicle A 102 and Vehicle C106) and
6. vehicle A 102 and vehicle C 106 have similar headings.

When one or more of these criteria are met, vehicle B 104 may determine, at block 206, that vehicle A 102 and vehicle C 106 should be communicating because they have coincident paths. The rules may be fixed within vehicle B 104 or may be configurable based on the geometry and dynamics of the situation. In addition, the rules may change as vehicle B 104 becomes aware of the AS or DA applications being executed on either vehicle A 102 or vehicle C 106. Vehicle B 104 may extract and apply rules from either or both of the other vehicles to determine whether communication is beneficial. If it is determined, at block 206, that the vehicles do not have coincident paths, then processing continues at block 204. Vehicle A 102 and vehicle D 108 would not be found to have a coincident path at block 206 and as a result processing would continue at block 204 to monitor the spatial relationship between vehicle A 102 and vehicle D 108. The intermediate node may be monitoring several pairs of vehicles at a time and performing the processing depicted in FIG. 2 for each pair.

If it is determined, at block 206, that the vehicles have coincident paths, then block 208 is performed to determine if vehicle A 102 and vehicle C 106 can communicate with each other directly (e.g. are they within each other's broadcast range, is an object blocking communication). An object obstructing or blocking communication may include, but is not limited to a building, a truck, and another vehicle). Any method known in the art may be utilized to perform this determination. An exemplary, and relatively simple, method is for vehicle B 104 to issue a request to vehicle A 102 and/or vehicle C 106 for its link information. The request could be very general and ask one of the vehicles for all of its link information, or the request could be specific and ask the vehicle if it has a link to another specific vehicle. If the response from the other vehicle is that a reliable communication link is established, vehicle B 104 should not act as an intermediate node and the processing continues at block 204. However, if a reliable link has not been established, vehicle B 104 notifies one or both of the other vehicles (vehicle A 102 and vehicle C 106) that the complimentary vehicle exists at block 210. So, vehicle B 104 would notify vehicle A 102 of the existence of vehicle C 106 and/or vehicle B 104 would notify vehicle C 106 of the existence of vehicle A 102. In an alternate exemplary embodiment, vehicle B 104 blindly forwards packets from vehicle A 102 to vehicle C 106 and vice versa until vehicle B 104 determines that the two vehicles should no longer exchange information or that they are communicating directly. Processing then continues at block 204.

The process depicted in FIG. 2 is just one example of how vehicle B 104 can act as an intermediate node for vehicle A 102 and vehicle C 106. Other process flows are possible to determine when and how to communicate the presence of vehicle A 102 to vehicle C 106 and vice versa. For example, vehicle B 104 could broadcast any data that it receives and not go through blocks 204 through 208 in FIG. 2. As part of a general periodic broadcast message, each vehicle could code its link information into the message so that any other vehicle could determine if a link with a third, coincident vehicle is missing. The other vehicles would decode the link information and attempt to find the missing links to other coincident vehicles. The link information could include all other vehicles with which the vehicle has a direct communication link or may only contain links for other vehicles with which it has determined meet the coincident criteria. The coding scheme used could simply be a straight copy of the link table, or the link table meeting some criteria, or could be represented by a mathematical formula that relates node identification and/or geographic location to create a semi-unique number allowing other vehicles to determine which of the coincident vehicles is not linked, or an encrypted and/or compressed version of any of these.

Figure 3:
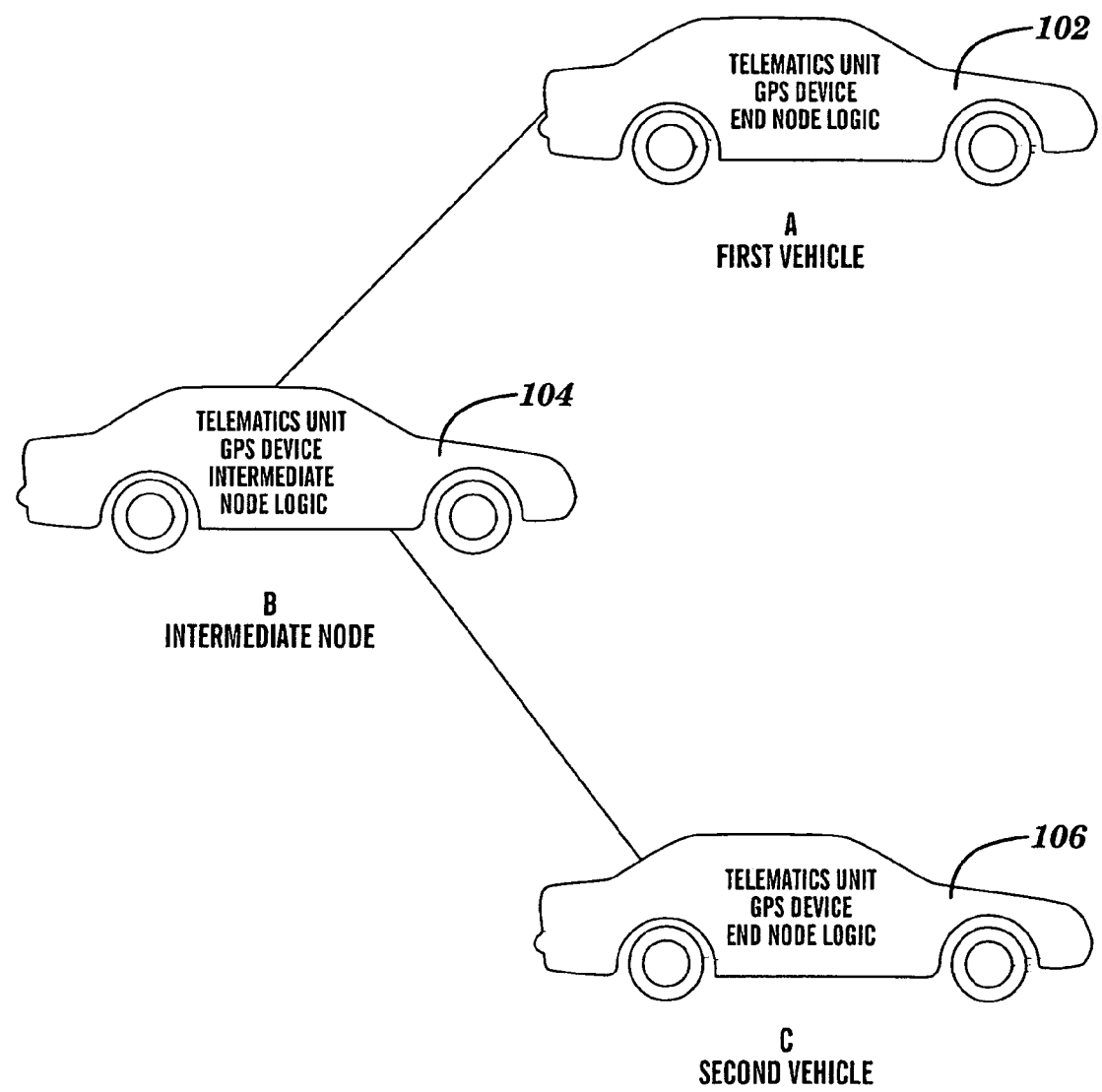
FIG. 3 is a block diagram of a system that may be implemented by exemplary embodiments of the present invention.

FIG. 3 is a block diagram of a system that may be implemented by exemplary embodiments of the present invention. FIG. 3 includes vehicle A 102 (also referred to herein as the first vehicle) and vehicle C 106 (also referred to herein as the second vehicle) in communication with vehicle B 104 (also referred to herein as the intermediate node). Vehicle A 102 includes a telematics unit for communicating with vehicle B 104, a GPS device (or any other geographic location system for determining the geographic location of vehicle A 102) and end node logic for determining when and what data to communicate to vehicle B 104. The end node logic may be in communication with AS and DA systems on vehicle A 102. In addition, the end node logic may collect vehicle status information, environment data and/or driver information data to transmit to vehicle B 104 to determine if communication should be established with vehicle C 106. The end node logic may be implemented by hardware and/or software and in an exemplary embodiment of the present invention is implemented by software that is located on a dedicated or shared microprocessor in vehicle A 102. Vehicle C 106 also includes a telematics unit, a GPS device and end node logic similar to vehicle A 102.

Vehicle B 104, the intermediate node, also includes a telematics unit for communicating with vehicle A 102 and vehicle C 106 as well as a GPS device. In addition, vehicle B 104 includes intermediate node logic for performing the processing described above in reference to FIG. 2. The intermediate node logic may be implemented by hardware and/or software and in an exemplary embodiment of the present invention is implemented by software that is located on a dedicated or shared microprocessor in vehicle B 104. In alternate exemplary embodiments, vehicle A 102, vehicle B 104, and vehicle C 106 each include the intermediate node logic as well as the end node logic so that any of the three vehicles may perform the processing described in FIG. 2 to act as an intermediate node if needed.

The communication between the vehicles may be provided by any method known in the art, including, but not limited to any IEEE 802.11 protocol or any dedicated short range communication (DSRC) device utilizing a single or multiple channel protocol with fixed or variable transmission power.

Other items, besides vehicles, may be utilized to provide the functionality of the intermediate node. For example, stationary objects, such as traffic signals, may be utilized as an intermediate node to perform the processing described in reference to vehicle B 104 above.

In alternative exemplary embodiments of the present invention, vehicle A 102 acts as the intermediate node. This may occur when vehicle A 102 can "hear" communication from vehicle C 106 but vehicle C 106 cannot hear communication from vehicle A 102. In this case vehicle A 102 may try to communicate with. vehicle C 106 using a different protocol or by increasing. the broadcasting power.

Exemplary embodiments of the present invention may be utilized to extend the broadcast range of vehicles without increasing the transmission power. Another advantage of exemplary embodiments of the present invention is that the broadcast communication between vehicles is extended beyond line of sight. The associated overhead may be reduced when compared to alternative ad hoc network protocols. Further, exemplary embodiments of the present invention allow nodes to discover one another and use other ad hoc network protocols to establish a communication link.

As described above, the embodiments of the invention may be embodied in the form of hardware, software, firmware, or any processes and/or apparatuses for practicing the embodiments. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for vehicle-to-vehicle communication, the method comprising:

at an intermediate node,
receiving data about a first vehicle;
receiving data about a second vehicle;
in response to the receiving the data about the first and the second vehicles, at least one of, notifying the first vehicle about the presence of the second vehicle and notifying the second vehicle about the presence of the first vehicle;
determining if the first vehicle and the second vehicle can communicate with each other directly in response to the receiving;
performing the notifying if the first vehicle and the second vehicle cannot communicate with each other directly;
determining if the first vehicle and the second vehicle have paths that occur in the same position; and
performing the notifying if the first vehicle and the second vehicle have paths that occur in the same position and the first vehicle and the second vehicle cannot communicate with each other directly.

2. The method of claim 1 wherein the entity is a third vehicle.

3. The method of claim 1 wherein the entity is a stationary object.

4. The method of claim 1 wherein the intermediate node forwards one or more of the data received from the first vehicle to the second vehicle and the data received from the second vehicle to the first vehicle.

5. A method for vehicle-to-vehicle communication, the method comprising:

at an intermediate node of an entity other than a first vehicle and a second vehicle, receiving data about the first vehicle;

receiving data about the second vehicle;

in response to the receiving the data about the first and the second vehicles, at least one of, notifying the first vehicle about the presence of the second vehicle and notifying the second vehicle about the presence of the first vehicle;

determining if the first vehicle and the second vehicle can communicate with each other directly in response to the receiving;

performing the notifying if the first vehicle and the second vehicle cannot communicate with each other directly; and at least one of forwarding data received from the first vehicle to the second vehicle and forwarding data received from the second vehicle to the first vehicle, if the first vehicle and the second vehicle cannot communicate with each other directly.

6. The method of claim 5 wherein the data about the first vehicle includes a geographic location of the first vehicle and dynamic information about the first vehicle.

7. The method of claim 6 wherein the dynamic information includes one or more of heading direction of the first vehicle and a speed of the first vehicle.

8. The method of claim 5 wherein the data about the second vehicle includes a geographic location of the second vehicle and dynamic information about the second vehicle.

9. The method of claim 8 wherein the dynamic information includes one or more of a heading direction of the second vehicle and a speed of the second vehicle.

10. The method of claim 5 wherein the notifying the first vehicle includes transmitting a geographic location of the second vehicle to the first vehicle and the notifying the second vehicle includes transmitting a geographic location of the first vehicle to the second vehicle.

11. The method of claim 10 wherein the notifying the first vehicle includes transmitting dynamic information from the second vehicle to the first vehicle and the notifying the second vehicle includes transmitting dynamic information from the first vehicle to the second vehicle.

12. A method for vehicle-to-vehicle communication, the method comprising:

at an intermediate node of an entity other than a first vehicle and a second vehicle, receiving data about the first vehicle;

receiving data about the second vehicle;

in response to the receiving the data about the first and the second vehicles, at least one of, notifying the first vehicle about the presence of the second vehicle and notifying the second vehicle about the presence of the first vehicle;

determining if the first vehicle and the second vehicle can communicate with each other directly in response to the receiving;

performing the notifying if the first vehicle and the second vehicle cannot communicate with each other directly; and wherein the determining includes:

receiving link information from the first vehicle and the second vehicle; and determining that the first vehicle and the second vehicle cannot communicate with each other directly if the first vehicle does not include a link to the second vehicle or the second vehicle does not include a link to the first vehicle.

13. A system for vehicle-to-vehicle communication, the system comprising:

a telematics unit; and a processor in communication with the telematics unit, the processor including instructions for facilitating:

receiving data about a first vehicle;

receiving data about a second vehicle;

in response to the receiving the data about the first and the second vehicles, at least one of, notifying the first vehicle about the presence of the second vehicle and notifying the second vehicle about the presence of the first vehicle;

determining if the first vehicle and the second vehicle can communicate with each other directly in response to the receiving;

performing the notifying if the first vehicle and the second vehicle cannot communicate with each other directly;

determining if the first vehicle and the second vehicle have paths that occur in the same position; and performing the notifying if the first vehicle and the second vehicle have paths that occur in the same position and the first vehicle and the second vehicle can communicate with each other directly.

* * * * *